United States Patent
Bouron et al.

(10) Patent No.: US 9,127,717 B1
(45) Date of Patent: Sep. 8, 2015

(54) SPACER FOR ROLLING BEARING HAVING AT LEAST A REINFORCING BEAM

(71) Applicants: Cyril Bouron, Puits de Courson (FR); Jean-Baptiste Magny, Chevannes (FR); Pascal Ovize, Chitry le Fort (FR); Pascal Vioux, Provency (FR)

(72) Inventors: Cyril Bouron, Puits de Courson (FR); Jean-Baptiste Magny, Chevannes (FR); Pascal Ovize, Chitry le Fort (FR); Pascal Vioux, Provency (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/224,623

(22) Filed: Mar. 25, 2014

(51) Int. Cl.
*F16C 33/372* (2006.01)
*F16C 33/38* (2006.01)

(52) U.S. Cl.
CPC .................................. *F16C 33/3818* (2013.01)

(58) Field of Classification Search
CPC .............................. F16C 33/3818; F16C 33/51
See application file for complete search history.

(56) References Cited

U.S. PATENT DOCUMENTS

| | | | |
|---|---|---|---|
| 2006/0120637 A1 | 6/2006 | Kuwabara | |
| 2008/0124010 A1 | 5/2008 | Schupies et al. | |

FOREIGN PATENT DOCUMENTS

| | | | |
|---|---|---|---|
| FR | 2222898 A5 | 10/1974 | |
| JP | S63123824 U | 8/1988 | |
| JP | 2008064248 A | 3/2008 | |

*Primary Examiner* — Thomas R. Hannon
(74) *Attorney, Agent, or Firm* — Bryan Peckjian; SKF USA Inc. Patent Dept.

(57) ABSTRACT

The spacer is adapted for a rolling bearing comprising an inner ring, an outer ring and at least one row of contact rollers disposed between raceways provided on the rings. The spacer comprises opposite first and second portions 11, 12 facing one another and at least a first lateral portion 13 extending transversally between the first and second portions and connected to the portions. The first and second portions and the first lateral portion delimit at least partly a pocket 14 laterally open on the side opposite to the lateral portion 13 and configured to receive at least a contact roller. The first and second portions each comprise an inner contact surface 11a, 12a with an end face of the roller. The spacer further comprises at least one reinforcing beam 16, 17 extending transversally between the first and second portions and connected to the portions.

16 Claims, 5 Drawing Sheets

SPACER FOR ROLLING BEARING HAVING AT LEAST A REINFORCING BEAM

CROSS-REFERENCE TO RELATED APPLICATIONS

This application claims priority from European Patent Application No. EP13160802 filed Mar. 25, 2013.

FIELD OF THE INVENTION

The present invention relates to the field of rolling bearings, in particular rolling bearings having an inner ring, an outer ring, and one or more rows of contact rollers therebetween. The invention relates more particularly to the field of large-diameter rolling bearings, notably those used in a tunnel boring machine.

BACKGROUND OF THE INVENTION

A large-diameter rolling bearing comprises generally two concentric inner and outer rings, at least a row of contact rollers arranged between raceways provided on the rings, and a plurality of spacers disposed circumferentially between the rollers. Such rolling bearings are generally loaded, both axially and radially, often with a relatively strong load.

French patent FR 2 222 898 relates to apertured spacers for rolling bearing which, by being assembled together, form a cage for the rollers. Each apertured spacer is of a substantially rectangular shape and is provided with a recess retaining the associated roller introduced by force through one aperture, the width of the aperture being less than the diameter of the roller. A convex boss is located at a lower corner of the spacer whereas a concave recess having a complementary shape is located at an opposite lower corner. Adjacent spacers are interengaged by virtue of the engagement of the boss of each spacer in the recess of the adjacent spacer.

With such spacers, the number of contact rollers which can be introduced between the rings of the rolling bearing is strongly limited. This leads to a low load bearing capacity as well as a limited service life.

One aim of the present invention is to overcome these drawbacks.

SUMMARY OF THE INVENTION

It is a particular object of the present invention to provide a spacer adapted to increase the load bearing capacity of the associated rolling bearing.

It is a particular object of the present invention to provide a spacer which is simple to manufacture, economic and having a good reliability.

It is a further object of the present invention to provide a spacer having a good stiffness while guaranteeing low deformations during and after manufacturing.

In one embodiment, the spacer for rolling bearing comprising an inner ring, an outer ring and at least one row of contact rollers disposed between raceways provided on the rings, comprises opposite first and second portions facing one another and at least a first lateral portion extending transversally between the first and second portions and connected to the portions, the first and second portions and the first lateral portion delimiting at least partly a pocket laterally open on the side opposite to the lateral portion and configured to receive at least a contact roller. The first and second portions each comprise an inner contact surface with an end face of the roller. The spacer further comprises at least one reinforcing beam extending transversally between the first and second portions and connected to the portions.

In one preferred embodiment, the at least one reinforcing beam extends transversally between the inner contact surfaces of the first and second portions and is connected to the surfaces.

Advantageously, the at least one reinforcing beam may comprise an inner contact surface forming a bearing surface for an exterior rolling surface of the roller. In one embodiment, the inner contact surface has in cross-section a profile in the shape of an arc of circle with a radius R defined by:

$0.5 \times D \leq R \leq 0.57 \times D$, with D corresponding to the diameter of the roller.

In one embodiment, the at least reinforcing beam is disposed at a corner of the first and second portions.

Preferably, the at least one reinforcing beam extends longitudinal edges of the first and second portions.

In one embodiment, the spacer comprises a first reinforcing beam disposed on the side opposite to the first lateral portion. The first reinforcing beam may extend between lateral edges of the first and second portions which are located on the side opposite to the first lateral portion.

The spacer may further comprise a second reinforcing beam facing the first reinforcing beam, the reinforcing beams being disposed both on one side of the first and second portions. In one embodiment, the second reinforcing beam is connected to the first lateral portion.

The spacer may further comprise, on the side opposite to the first lateral portion, a retaining means extending from one of the first and second portions towards the other portion and having an inner surface forming a bearing surface for an exterior rolling surface of the roller.

In one embodiment, the retaining means comprises a hook.

In another embodiment, the retaining means comprises a second lateral portion facing the first lateral portion, the lateral portions delimiting together with the first and second portions the pocket. The first and second lateral portion may each comprise an inner contact surface forming a bearing surface for an exterior rolling surface of the roller.

Advantageously, the first reinforcing beam is connected to the second lateral portion. A free edge of the second lateral portion may define with one of the first and second portions an aperture in order to open laterally the pocket on the side opposite to the first lateral portion.

In one embodiment, the spacer comprises at least first and second reinforcing beams extending transversally between the first and second portions and connected to the portions. The reinforcing beams are disposed both on one side of the first and second portions. The first reinforcing beam is disposed on the side opposite to the first lateral portion and the second reinforcing beam faces the first reinforcing beam.

With such an arrangement, the mounting of the roller into the spacer may be made by a simple axial pushing movement. In the mounted position, the associated roller is axially maintained in one direction. Besides, the mounting of the spacer and its associated roller into the rolling bearing is easier since the roller is carried by the beams on one side of the spacer.

In another aspect of the invention, a rolling bearing comprises an inner ring, an outer ring, at least one row of contact rollers disposed between raceways provided on the rings, and a plurality of spacers as previously defined and disposed circumferentially between the rollers.

The rolling bearing as previously defined may be particularly useful as a bearing for a tunnel boring machine.

BRIEF DESCRIPTION OF THE DRAWINGS

The present invention and its advantages will be better understood by studying the detailed description of specific embodiments given by way of non-limiting examples and illustrated by the appended drawings on which:

FIG. 5 is a section on V-V of FIG. 4, FIGS. 6 and 7 are perspective views of a spacer according to a second example of the invention.

DETAILED DESCRIPTION OF THE INVENTION

Figure 1:
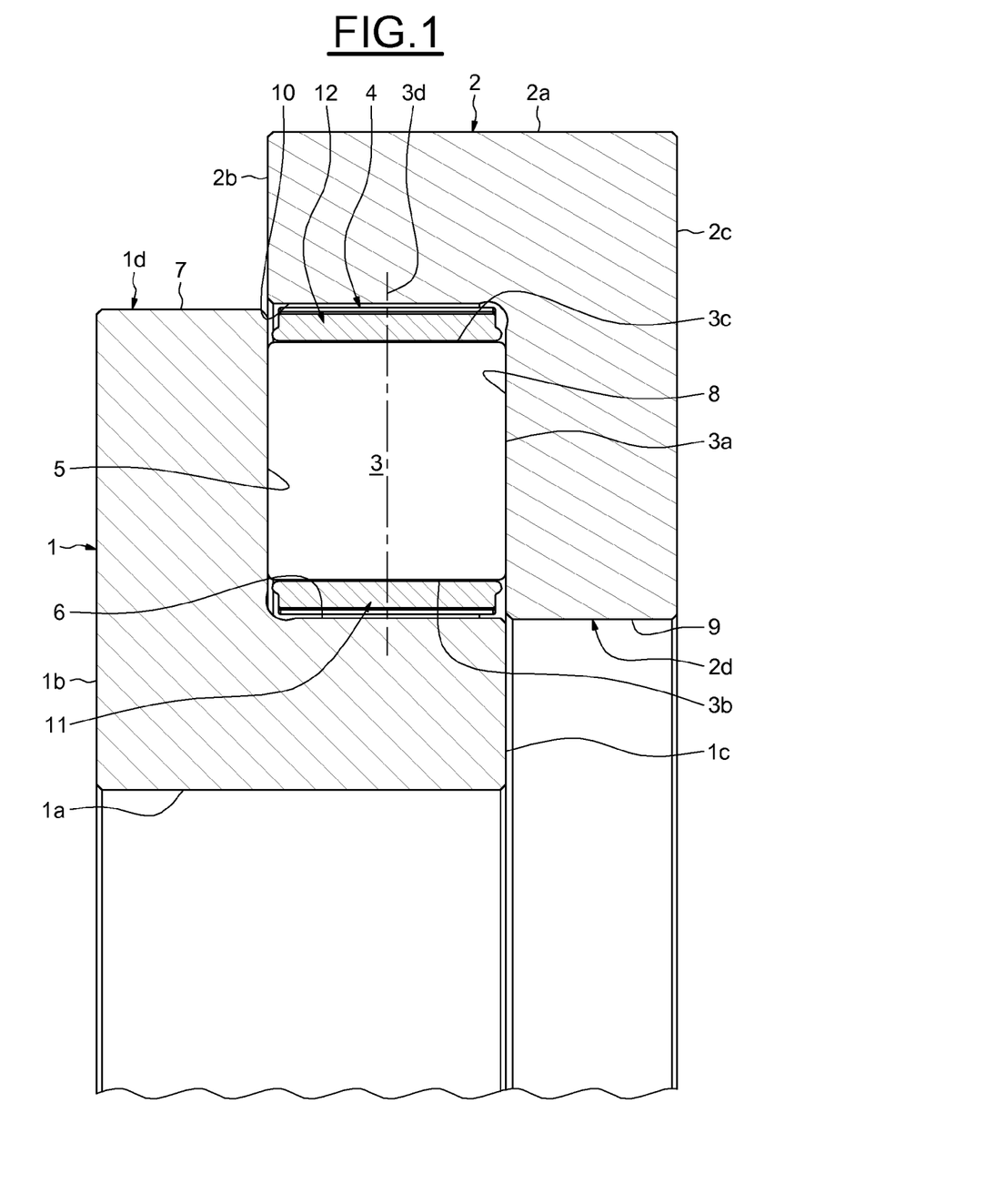
FIG. 1 is a half section of a rolling bearing according to a first example of the invention.
Figure 2:
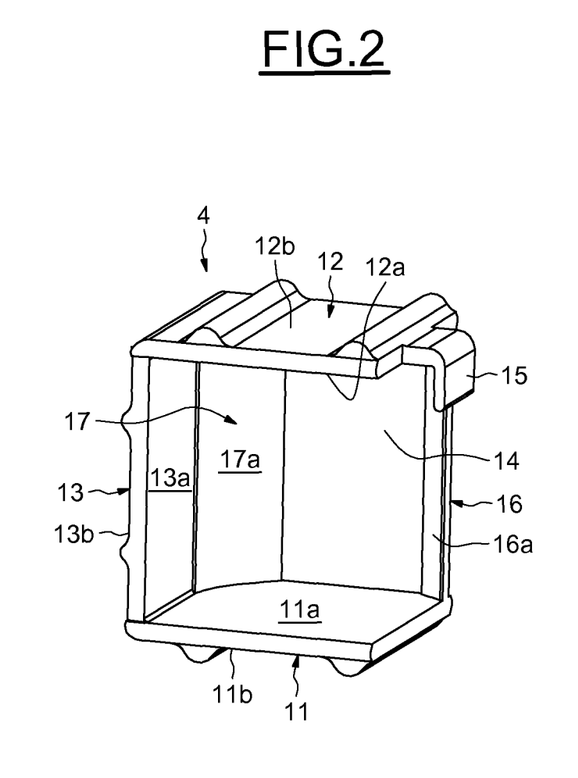
FIG. 2 is a perspective view of a spacer of the rolling bearing of FIG. 1.
Figure 3:
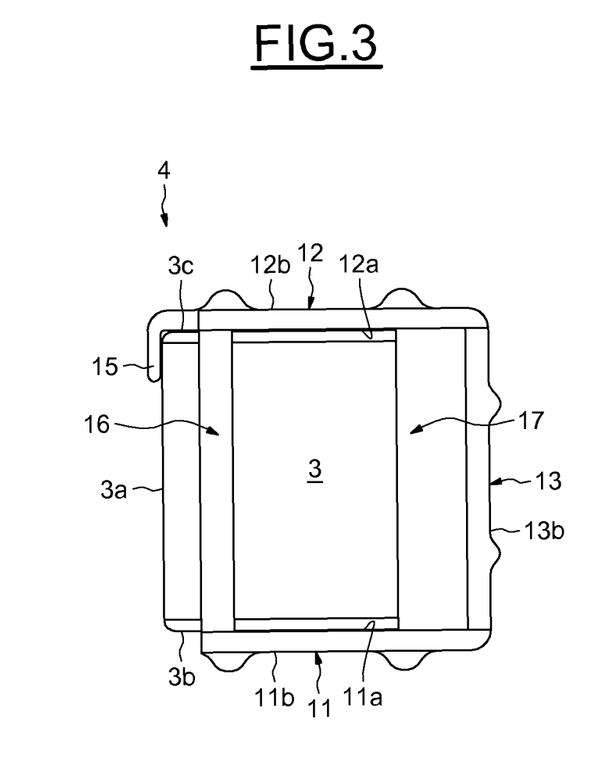
FIG. 3 is a side view of the spacer of FIG. 2 with its associated roller.
Figure 4:
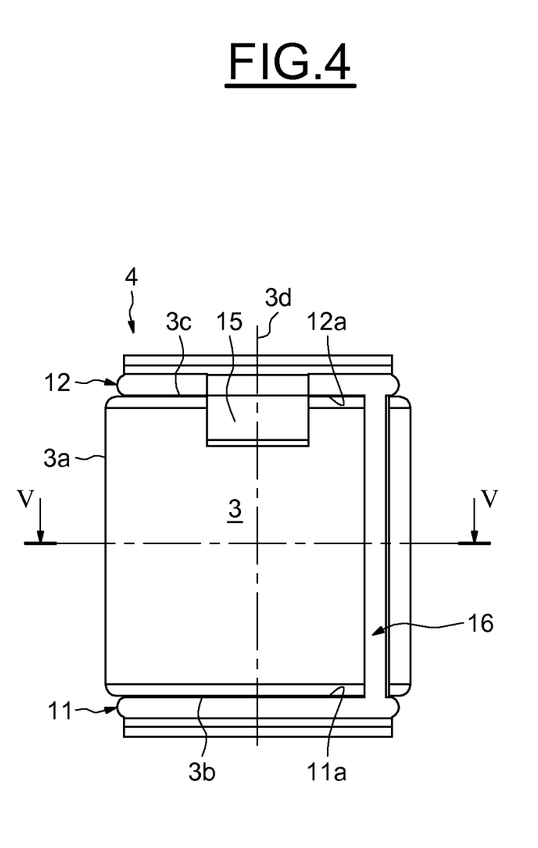
FIG. 4 is a front view of the spacer of FIGS. 2 and 3 with its roller.
Figure 5:
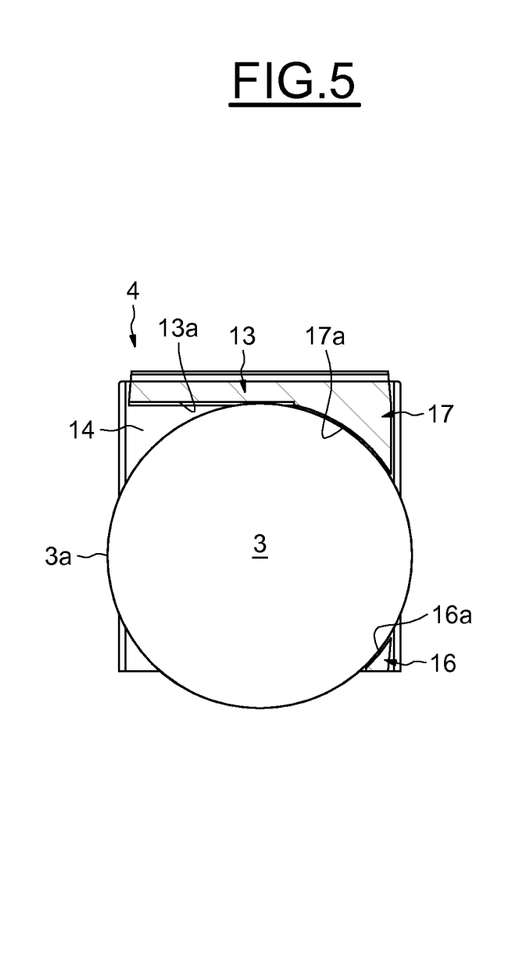
Figure 6:
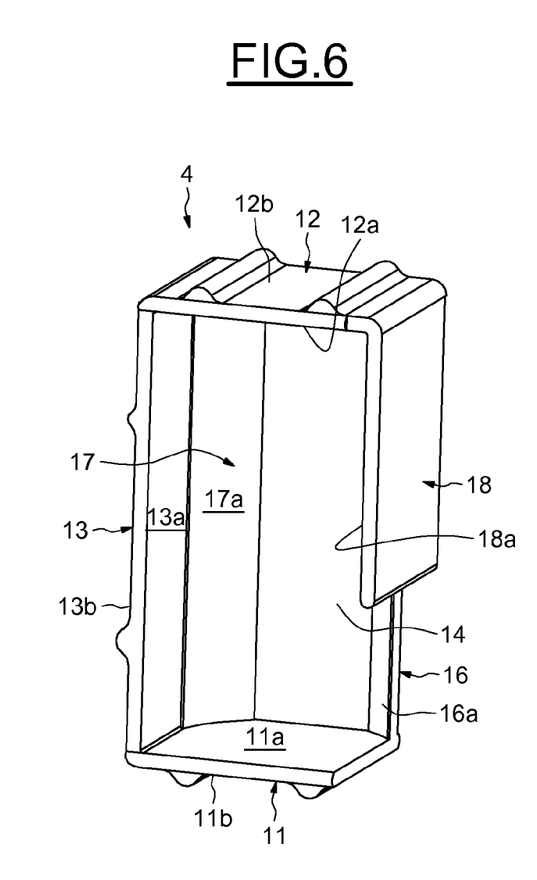
Figure 7:
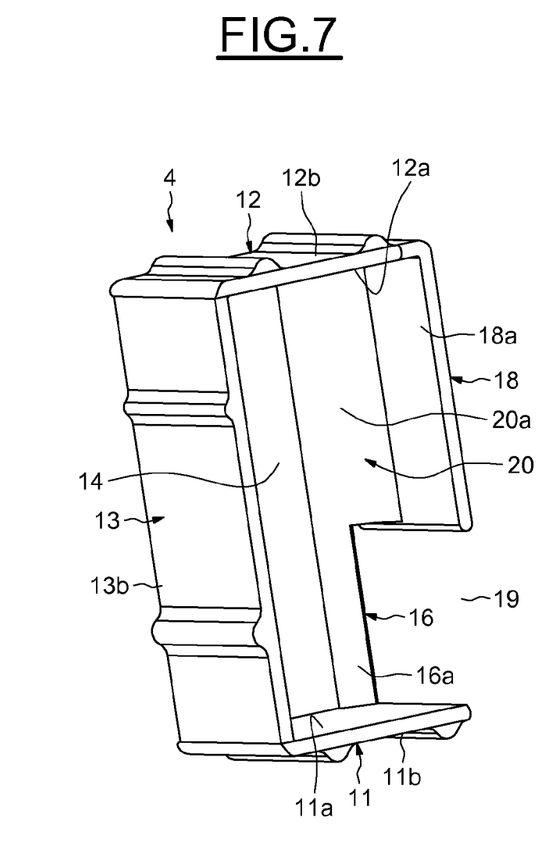
Figure 8:
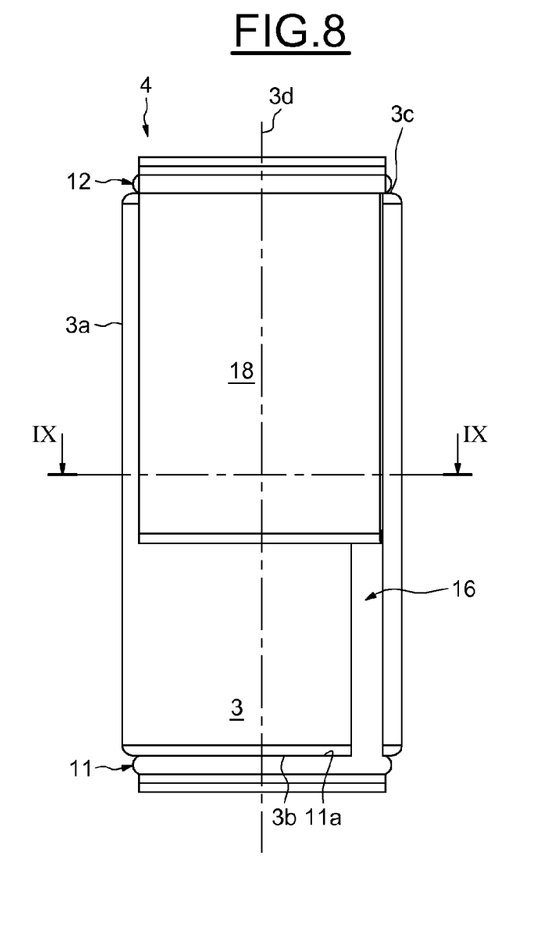
FIG. 8 is a front view of the spacer of FIGS. 6 and 7 with its associated roller.
Figure 9:
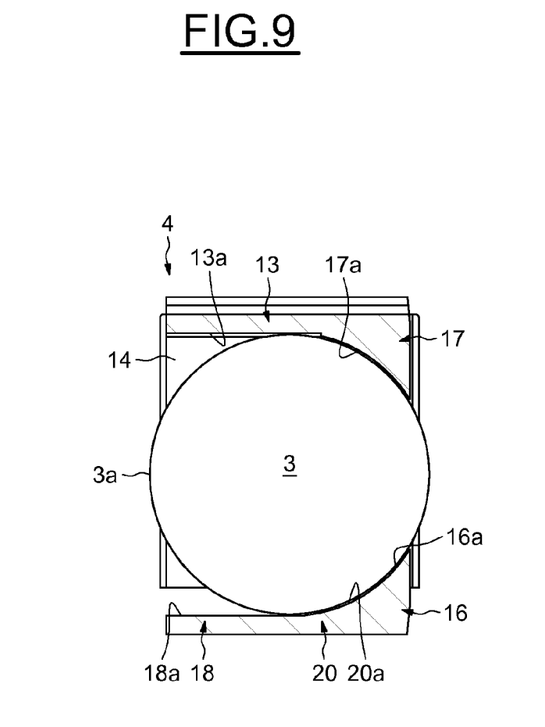
FIG. 9 is a section on IX-IX of FIG. 8.

The rolling bearing as illustrated on the FIG. 1 is a large-diameter rolling bearing comprising an inner ring 1 and an outer ring 2 between which is housed one row of contact rollers 3. The rolling bearing also comprises a plurality of spacers 4 disposed circumferentially between the rollers 3 to maintain their circumferential spacing. As will be described later, the spacers 4 each exhibit a good stiffness and are adapted to avoid high deformations during and after manufacturing.

The inner and outer rings 1, 2 are concentric and extend axially along the bearing rotation axis (not shown) of the rolling bearing. The rings 1, 2 are of the solid type. A "solid ring" is to be understood as a ring obtained by machining with removal of material (by machining, grinding) from metal tube stock, bar stock, rough forgings and/or rolled blanks.

The rollers 3 are identical with one another and each comprise an exterior rolling surface 3a and opposite end transverse faces 3b, 3c delimiting axially the rolling surface. In the illustrated example, the rolling surface 3a of each roller has a cylindrical profile. Alternatively, the rolling surfaces may have a spherical profile or a logarithmic profile. In the illustrated example, the angle between the rotation axis 3d of each roller and the bearing axis is equal to 90°. The rotation axis 3d of each roller extends radially.

The inner ring 1 has a bore 1a of cylindrical shape designed to be fixed to a chassis or to a structure of machine (not shown) and delimited by opposite radial lateral surfaces 1b, 1c. The inner ring 1 also comprises a stepped exterior cylindrical surface 1d onto which an annular radial raceway 5 is formed. The raceway 5 has in cross-section a straight internal profile in contact with the rolling surfaces 3a of the rollers 3. The raceway 5 is formed by the radial surface provided between a first axial surface 6 of small-diameter and a second axial surface 7 of large-diameter of the stepped exterior cylindrical surface 1d. The axial surface 6 forms an annular guiding surface which may be in radial contact with the spacers 4. The axial guiding surface 6 is straight, disposed perpendicular to the raceway 5 and connected to the edge of small-diameter of the raceway by an annular concave fillet. The guiding surface 6 extends axially from the edge and is connected to the radial surface 1c of the inner ring. The guiding surface 6 and the raceway 5 of the inner ring delimit an annular groove.

The outer ring 2 comprises an outer cylindrical surface 2a delimited by opposite radial lateral surfaces 2b, 2c. The outer ring 2 also comprises a stepped annular bore 2d of cylindrical shape into which an annular radial raceway 8 is formed. The raceway 8 has in cross-section a straight internal profile in contact with the rolling surfaces 3a of the rollers 3. The raceway 5 of the inner ring and the raceway 8 of the outer ring axially face each other and are parallel. The raceway 8 is formed by the radial surface provided between a first axial surface 9 of small-diameter and a second axial surface 10 of large-diameter of the stepped bore 2d. The axial surface 10 forms an annular guiding surface which may be in radial contact with the spacers 4. The guiding surface 10 of the outer ring and the guiding surface 6 of the inner ring radially face each other and are parallel. The guiding surface 10 is straight, disposed perpendicular to the raceway 8 and connected to the edge of large-diameter of the raceway by an annular concave fillet. The guiding surface 10 extends axially from the edge and is connected to the radial surface 2b of the outer ring. The guiding surface 10 and the raceway 8 of the outer ring delimit an annular groove.

The raceway 5 and the guiding surface 6 of the inner ring define together with the raceway 8 and the guiding surface 10 of the outer ring an annular space inside which the rollers 3 and the spacers 4 are disposed. Each roller 3 arranged between the raceways 5, 8 is maintained by the associated spacer 4 which may bear against the guiding surfaces 6, 10 and the raceways 5, 8.

The spacers 4 are identical with one another and each placed between two consecutive rollers 3. Each spacer 4 is made in one part by molding a polymer material such as polyamide. Alternatively, the spacers 4 may be made from metal or bronze.

As shown on FIGS. 2 to 5, each spacer 4 comprises two parallel inner and outer portions 11, 12 adapted to come into contact with the facing guiding surfaces and the raceways of the inner and outer rings, and a lateral portion 13 extending transversally between the opposite portions 11, 12 and adapted to be located circumferentially between two adjacent rollers 3. The lateral portion 13 is connected to a lateral edge of the inner portion 11 and to the opposite facing lateral edge of the outer portion 12. The inner and outer portions 11, 12 forming first and second portions and the lateral portion 13 each have a rectangular shape with similar length and thickness. The width of the portions 11, 12 and 13 is slightly smaller than the radius of the roller 3.

As shown on FIG. 1, the raceways 5, 8 and the guiding surface 6, 10 of the inner and outer rings each form a flank having a direct contact surface with the inner and outer parts 11, 12 of each spacer to have a slight relative sliding between each spacer 4 and the rings 1, 2. In order to limit the induced friction torque of the spacers 4, slight axial clearances are foreseen between each spacer and the raceways 5, 8 of the rings and slight radial clearances are foreseen between each spacer and the guiding surface 6, 10.

Referring once again to FIGS. 2 to 5, the inner and outer portions 11, 12 and the lateral portion 13 of each spacer have in cross-section the overall shape of a C and delimit a pocket 14 for receiving one roller 3. The pocket 14 is laterally open on the side opposite to the lateral portion 13 between the inner and outer portions 11, 12. In the mounted position of the spacer 4 into the rolling bearing, the pocket 14 is delimited in the circumferential direction by the lateral portion 13 and is delimited in the radial direction by the inner and outer portions 11, 12. In this mounted position, the pocket 14 of one spacer 4 is circumferentially open towards the adjacent spacer 4. The pocket 14 of each spacer 4 is open both axially in the two directions and circumferentially in one direction. The pocket 14 is open on three sides. With regard to the rotation axis 3d of the associated roller 3, the inner and outer portions 11, 12 extend radially, the lateral portion 13 extends axially between the portions and the pocket 14 is radially open toward the outside. On the side opposite to the lateral portion 13, an opening or aperture is delimited axially by the free lateral edges of the inner and outer portions 11, 12 and extends axially between these portions in order to open laterally the pocket 14.

The inner and outer portions 11, 12 of each spacer have inner planar contact surfaces 11a, 12a facing each other and forming bearing surfaces for the end faces 3b, 3c of the associated roller. The gap between the planar contact surfaces 11a, 12a is substantially equal to the length of the roller 3. The lateral portion 13 comprises an inner planar contact surface 13a forming a bearing surface for the rolling surface 3a of the associated roller.

The inner portion 11 of each spacer also comprises a planar outer surface 11b opposite to the inner surface 11a and two spaced guiding ribs (not referenced) provided on the outer surface. The guiding ribs protrude outwards relative to the outer surface 11b and extend transversally on the outer surface from one of the longitudinal edges of the inner portion 11 to the other edge. The opposite longitudinal edges delimit the inner and outer surfaces 11a, 11b. In the mounted position of the spacer 4 into the rolling bearing, the outer surface 11b faces the guiding surface 6 of the inner ring while remaining distant from the latter, and the guiding ribs may come into contact with the guiding surface. Since the inner and outer portions 11, 12 of each spacer are similar in the illustrated example, only one of them is described here in detail.

The lateral portion 13 of each spacer comprises a planar outer surface 13b opposite to the inner contact surface 13a and two spaced guiding ribs (not referenced) provided on the outer surface. The guiding ribs protrude outwards relative to the outer surface 13b and extend transversally on the outer surface from one of the longitudinal edge of the lateral portion 13 to the other edge. The opposite longitudinal edges delimit the outer surface 13b. In another embodiment, it may be possible to have a spacer deprived of ribs on the inner, outer and lateral portions 11, 12 and 13.

The spacer 4 further comprises a hook 15 which slightly protrudes inwards toward the inner portion 11 from the free edge of the outer portion 12. The hook 15 is disposed on the outer portion 12 on the side opposite to the lateral portion 13. The hook 15 is centered on the free edge of the outer portion 12 and remains distant from the longitudinal edges of the outer portion. The hook 15 comprises an inner planar contact surface forming a bearing surface for the rolling surface 3a of the associated roller. The hook 15 is adapted to interfere with the roller 3 in order to avoid an escape from the open pocket 14. The hook 15 forms a circumferential retaining means for the roller 3.

The spacer 4 further comprises first and second reinforcing beams 16, 17 extending transversally between the inner and outer portions 11, 12. The reinforcing beams 16, 17 extend transversally between the planar contact surfaces 11a, 12a of the inner and outer portions and are connected to the surfaces. The reinforcing beams 16, 17 are disposed both on one side of the portions 11, 12.

The first reinforcing beam 16 is disposed on the side opposite to the lateral portion 13. The reinforcing beam 16 extends transversally between the free facing lateral edges of the inner and outer portions 11, 12 which are located on the side opposite to the lateral portion 13. The reinforcing beam 16 is connected to the lateral edges. The reinforcing beam 16 also extends transversally between the facing longitudinal edges of the inner and outer portions 11, 12 and is connected to the edges. The reinforcing beam 16 extends both the free lateral edges of the inner and outer portions 11, 12 and the longitudinal edges of the portions. The reinforcing beam 16 is disposed at a corner of the planar contact surfaces 11a, 12a of the inner and outer portions. The reinforcing beam 16 has a concave inner surface 16a directed inward towards the pocket 14 and forming a bearing surface for the rolling surface 3a of the roller.

The second reinforcing beam 17 faces the first reinforcing beam 16 and is connected to the lateral portion 13. The reinforcing beam 17 protrudes from the planar contact surface 13a towards the first reinforcing beam 16. The reinforcing beam 17 extends transversally between the facing longitudinal edges of the inner and outer portions 11, 12 and is connected to the edges. The reinforcing beam 17 is disposed at a corner of the planar contact surfaces 11a, 12a of the inner and outer portions. The reinforcing beam 17 has a concave inner surface 17a directed inward towards the pocket 14 and forming a bearing surface for the rolling surface 3a of the roller. The inner surface 17a extends the planar contact surface 13a of the lateral portion 13. Each of the inner contact surfaces 16a, 17a of the reinforcing beams has in cross-section a profile in the shape of an arc of circle with a radius R defined by $0.5 \times D \leq R \leq 0.57 \times D$ with D corresponding to the diameter of the roller, R and D being expressed in mm.

The reinforcing beams 16, 17 extend from the contact surfaces 11a, 12a of the inner and outer portions and do not protrude outwards with regard to these portions. The reinforcing beams are spaced apart one form another along the facing longitudinal edges of the inner and outer portions 11, 12 and delimit an opening or aperture into which the roller 3 protrudes. On one side of the spacer 4, the reinforcing beams 16, 17 and the inner and outer portions 11, 12 form a rectangular frame inside which extends the rolling surface 3a of the roller.

The use of the reinforcing beams 16, 17 makes it possible to increase the mechanical strength of the spacer 4. The stiffness of the spacer 4 is also increased by interposing, between the facing inner and outer portions 11 and 12, rigidifying beams 16, 17. In the mounted position of the spacer 4 into the rolling bearing, the stiffness of the spacer is increased in the radial direction.

Besides, with the reinforcing members 16, 17 acting as transversal crossbars connected to the inner and outer portions, the deformations of the inner and outer portions are limited. The reinforcement beams 16, 17 limit the bending of one of the inner and outer portions 11, 12 relative to the other. In fact, with a spacer deprived of such reinforcing beams 16 and 17, during and after the manufacturing, the spacer is free to shrink or bend on itself and the inner and outer portions 11, 12 may be deformed inwards one relative to the other. This phenomenon can be problematic in the use of such a spacer later on because it can be impossible to mount the associated roller or the spacer can squeeze the roller during operation.

Otherwise, with the spacer 4 comprising the reinforcing beams 16 and 17, the mounting of the spacer and its associated roller 3 is easier since the roller is carried by the beams on one side of the spacer.

In the mounted position of the roller 3 inside the spacer 4, the inner and outer portions 11, 12, the lateral portion 13 and the hook 15, and the reinforcing beams 16, 17 maintain the roller. In the mounted position of each spacer 4 into the rolling bearing, the inner and outer portions 11, 12 maintain radially the roller 3, and the lateral portion 13 and the hook 15 circumferentially maintain the roller 3. The reinforcing beams 16, 17 axially maintain the roller 3 in one direction.

In the mounted position of the spacers 4 into the rolling bearing, at least one of the guiding ribs of the lateral portion of each spacer 4 bears against the rolling surface 3a of the roller 3 which is housed into the adjacent spacer 4 since the pocket of the spacer is laterally open towards the lateral portion 13 of the other spacer. There is a direct contact between the guiding rib(s) of the lateral portion of one spacer and the adjacent roller 3 supported by the successive spacer 4 in the circumferential direction. In the mounted position, there is only one lateral portion 13 disposed circumferentially between two successive rollers 3. The pocket 14 of each spacer enables to reduce the circumferential space between two successive rollers 3. Accordingly, the number of rollers 3 disposed between the inner and outer rings 1 and 2 may be increased. This leads to higher load bearing capacity of the rolling bearing as well as an increase of the service life.

In the second example illustrated on FIGS. 6 to 9, in which identical parts are given identical references, the spacer 4 is adapted to maintain a roller 3 having an increased length, for example equal to twice the length of the roller illustrated in the first example. Alternatively, a pair of two superposed rollers may be maintained by the spacer 4. In this case, the two associated rollers are mounted axially in contact to one another with regard to their common rotation axis.

In this example, the spacer 4 further comprises a second lateral portion 18 extending transversally from the outer portion 12 towards the inner portion 11 and facing the first lateral portion 13. The first and second lateral portions 13, 18 are parallel to one another. The second lateral portion 18 extends from the edge of the outer portion 12 located on the side opposite to the first lateral portion 13. The lateral portion 18 extends towards the inner portion 11 while remaining distant from the latter. The inner and outer portions 11, 12 and the lateral portions 13, 18 each have a rectangular shape with similar thickness. The width of the inner and outer portions 11, 12 and the lateral portions 13, 18 is slightly smaller than the radius of the roller 3.

The inner and outer portions 11, 12 and the opposite first and second lateral portions 13, 18 delimit the pocket 14. An opening or aperture 19 is defined between the second lateral portion 18 and the inner portion 11. The pocket 14 is laterally open on the side opposite to the first lateral portion 13 between the inner portion 11 and the second lateral portion 18. In the mounted position of the spacer 4 into the rolling bearing, the pocket 14 is delimited in the circumferential direction by the first and second lateral portions 13, 18. In this mounted position, the pocket 14 of one spacer 4 is circumferentially open towards the adjacent spacer 4 with the aperture 19. The pocket 14 of each spacer 4 is open both axially in the two directions and circumferentially in one direction. The pocket 14 is open on three sides. With regard to the rotation axis 3d of the roller 3 held into the pocket 14 of each spacer, the inner and outer portions 11, 12 extend radially, the first and second lateral portions 13, 18 and the reinforcing beams 16, 17 extend axially between the portions, and the pocket 14 is radially open toward the outside. The aperture 19 is delimited axially by the inner portion 11 and the lateral portion 18. A free end of the lateral portion 18 defines with the free edge of the inner portion 11 the aperture 19 to open laterally the pocket 14 on the side opposite to the first lateral portion 13. The free edge of the second lateral portion 18 remains distant from the inner portion 11 to delimit the aperture 19.

The second lateral portion 18 of the spacer comprises an inner planar contact surface 18a facing the contact surface 13a of the lateral portion 13 and forming a bearing surface for the rolling surface 3a of the roller. In the case of the spacer 4 maintains two superimposed rollers, the lateral portion 18 may have a length greater than the length of the upper roller in order to extend beyond the zone of contact between the upper roller and the lower roller. Accordingly, the inner contact surface 18a also forms a bearing surface for the rolling surface of the lower roller.

In this example, the first reinforcing beam 16 comprises an extension 20 which protrudes from the longitudinal edge of the beam located on the side opposite the first lateral portion 13 and which is connected to the second lateral portion 18. The extension 20 of the reinforcing beam has a length equal to the one of the lateral portion 18 and is connected to the planar contact surface 12a of the outer portion. The extension 20 extends transversally between the free edge of the lateral portion 18 and the longitudinal edge of the outer portion 12. The extension 20 faces the first reinforcing beam 16. The extension 20 has a concave inner surface 20a forming a bearing surface for the rolling surface 3a of the roller which extends the concave inner surface 16a and which is connected to the planar contact surface 18a of the lateral portion 18.

The general structure of each spacer 4 is lightened by the provision of a pocket 14 defined by three or four portions or lugs and open in the circumferential direction towards the outside on the side opposite to the lateral portion 13. A weight reduction for each spacer 4 is thus obtained. Besides, with the reinforcing beams 16, 17 extending between the inner and outer portions 11 and 12, the mechanical strength and the stiffness of the spacer 4 are increased. The deformations of the portions of the spacer are also reduced during and after the manufacturing and during use.

In the disclosed examples, each spacer comprises two reinforcing struts or beams provided between the inner and outer portions 11, 12. Alternatively, it could be possible to foresee only one reinforcing beam, for instance the one disposed on the side opposite to the lateral portion 13, or more than two reinforcing beams.

Although the invention has been illustrated on the basis of a rolling bearing having a single row of contact rollers, it should be understood that the invention can be applied to bearings having more rows of rollers. Otherwise, in the illustrated examples, the rolling bearing is adapted to accommodate axial loads. Alternatively, it may also be possible to have a rolling bearing adapted to accommodate radial loads or both axial and radial loads. Furthermore, the inner ring and/or the outer ring may comprise gearing teeth on their outer periphery, so as to be connected to driving gears for instance connected to the output shaft of a motor.

The invention claimed is:

1. A spacer for a rolling bearing including an inner ring, an outer ring, and at least one row of contact rollers disposed between raceways provided on the inner and outer rings, the spacer comprising:
   opposite first and second portions facing one another; and
   at least a first lateral portion extending transversally between the first and second portions and connected to the first and second portions,
   wherein the first and second portions and the first lateral portion delimit a pocket laterally open on the side opposite to the lateral portion and configured to receive at least a contact roller,
   wherein the first and second portions each provide an inner contact surface with an end face of the contact roller, and
   wherein the spacer further includes first and second reinforcing beams extending transversally between the first and second portions and connected to the first and second portions, the first and second reinforcing beams being disposed both toward one side of the first and second portions, the first reinforcing beam being disposed on a side of the first and second portions opposite to the first lateral portion and the second reinforcing beam being angled such that an interior surface of the second reinforcing beam faces in a direction away from the first lateral portion.

2. The spacer according to claim 1, wherein the first and second reinforcing beams extend transversally between the inner contact surfaces of the first and second portions and is connected to the surfaces.

3. The spacer according to claim 2, wherein the first and second reinforcing beams each includes an inner contact surface forming a bearing surface for an exterior rolling surface of the contact roller.

4. The spacer according to claim 3, wherein the inner contact surface has in cross-section a profile in the shape of an arc of circle with a radius (R) defined by:

$$0.5 \times D \leq R \leq 0.57 \times D$$

with D corresponding to the diameter of the contact roller.

5. The spacer according to claim 4, wherein the first and second reinforcing beams extend longitudinal edges of the first and second portions.

6. The spacer according to claim 5, wherein the first and second reinforcing beams is are disposed at a corner of the first and second portions.

7. The spacer according to claim 6, wherein the first reinforcing beam is disposed on the side opposite to the first lateral portion.

8. The spacer according to claim 7, wherein the first reinforcing beam extends between lateral edges of the first and second portions.

9. The spacer according to claim 8, wherein the second reinforcing beam faces the first reinforcing beam, the first and second reinforcing beams being disposed both on one side of the first and second portions.

10. The spacer according to claim 9, wherein the second reinforcing beam is connected to the first lateral portion.

11. The spacer according to claim 10, further comprising, on the side opposite to the first lateral portion, a retaining means extending from one of the first and second portions towards the other portion and having an inner surface forming a bearing surface for an exterior rolling surface of the contact roller.

12. The spacer according to claim 11, wherein the retaining means comprises a hook.

13. The spacer according to claim 11, wherein the retaining means provides a second lateral portion facing the first lateral portion, the lateral portions delimiting together with the first and second portions the pocket.

14. The spacer according to claim 13, wherein the first reinforcing beam is connected to the second lateral portion.

15. A rolling bearing comprising:
an inner ring;
an outer ring;
at least one row of contact rollers disposed between raceways provided on the inner and outer rings; and
a plurality of spacers disposed circumferentially between the contact rollers and having opposite first and second portions facing one another and at least a first lateral portion extending transversally between the first and second portions and connected to the portions,
wherein the first and second portions and the first lateral portion delimit a pocket laterally open on the side opposite to the lateral portion and configured to receive at least a contact roller,
wherein the first and second portions each provide an inner contact surface with an end face of the contact roller, and
wherein the spacer further includes first and second reinforcing beams extending transversally between the first and second portions and connected to the first and second portions, the first and second reinforcing beams being disposed both toward one side of the first and second portions, the first reinforcing beam being disposed on a side of the first and second portions opposite to the first lateral portion and the second reinforcing beam being angled such that an interior surface of the second reinforcing beam faces in a direction away from the first lateral portion.

16. A spacer for a rolling bearing including an inner ring, an outer ring, and at least one row of contact rollers disposed between raceways provided on the inner and outer rings, the spacer comprising:
opposite first and second portions facing one another; and
at least a first lateral portion extending transversally between the first and second portions and connected to the first and second portions,
wherein the first and second portions and the first lateral portion delimit a pocket laterally open on the side opposite to the lateral portion and configured to receive at least a contact roller,
wherein the first and second portions each provide an inner contact surface with an end face of the contact roller, and
wherein the spacer further includes first and second reinforcing beams extending transversally between the first and second portions and connected to the first and second portions,
wherein the first and second reinforcing beams extend transversally between the inner contact surfaces of the first and second portions and is connected to the surfaces,
wherein the first and second reinforcing beams include an inner contact surface forming a bearing surface for an exterior rolling surface of the contact roller,
wherein the inner contact surface has in cross-section a profile in the shape of an arc of circle with a radius (R) defined by:

$$0.5 \times D \leq R \leq 0.57 \times D$$

with D corresponding to the diameter of the contact roller,
wherein the first and second reinforcing beams extend longitudinal edges of the first and second portions,
wherein the first and second reinforcing beams are disposed at a corner of the first and second portions,
wherein the first reinforcing beam is disposed on the side opposite to the first lateral portion,
wherein the first reinforcing beam extends between lateral edges of the first and second portions,
wherein the second reinforcing beam faces the first reinforcing beam, the first and second reinforcing beams being disposed both on one side of the first and second portions,
wherein the second reinforcing beam is connected to the first lateral portion,
wherein, on the side opposite to the first lateral portion, a retaining means extends from one of the first and second portions towards the other portion and having an inner surface forming a bearing surface for an exterior rolling surface of the contact roller, and
wherein the retaining means comprises a hook.

* * * * *